US012715690B2

(12) United States Patent
Oda et al.

(10) Patent No.: US 12,715,690 B2
(45) Date of Patent: Aug. 25, 2026

(54) CONTROL DEVICE, DELIVERY SYSTEM, AND CONTROL METHOD

(71) Applicant: FUJI CORPORATION, Chiryu (JP)

(72) Inventors: Takuya Oda, Toyoake (JP); Koji Kawaguchi, Kasugai (JP); Hisato Sawanami, Kariya (JP)

(73) Assignee: FUJI CORPORATION, Chiryu (JP)

( * ) Notice: Subject to any disclaimer, the term of this patent is extended or adjusted under 35 U.S.C. 154(b) by 742 days.

(21) Appl. No.: 18/040,031

(22) PCT Filed: Aug. 21, 2020

(86) PCT No.: PCT/JP2020/031704
§ 371 (c)(1),
(2) Date: Jan. 31, 2023

(87) PCT Pub. No.: WO2022/038784
PCT Pub. Date: Feb. 24, 2022

(65) Prior Publication Data
US 2023/0312248 A1 Oct. 5, 2023

(51) Int. Cl.
*B65G 1/04* (2006.01)
*G06F 8/65* (2018.01)
(Continued)

(52) U.S. Cl.
CPC ............. *B65G 1/0492* (2013.01); *B65G 1/04* (2013.01); *G06F 8/65* (2013.01); *G06Q 10/08* (2013.01)

(58) Field of Classification Search
CPC ........ B65G 1/0492; B65G 1/04; B65G 67/20; G06Q 10/08; G06F 8/65
See application file for complete search history.

(56) References Cited

U.S. PATENT DOCUMENTS 6,067,502 A * 5/2000 Hayashida ........... G01C 21/367 701/428
2003/0105534 A1* 6/2003 Hara ...................... G05D 1/104 700/2
(Continued)

FOREIGN PATENT DOCUMENTS

CN 105658547 A 6/2016
JP 2010-92147 A 4/2010
(Continued)

OTHER PUBLICATIONS

International Search Report mailed on Oct. 27, 2021 in PCT/JP2020/031704 filed on Aug. 21, 2020 (2 pages).

*Primary Examiner* — Ernesto A Suarez
*Assistant Examiner* — Laurence R Brothers
(74) *Attorney, Agent, or Firm* — Oblon, McClelland, Maier & Neustadt, L.L.P.

(57) ABSTRACT

A control device according to the present disclosure is used in a delivery system having an automatic movement device that automatically moves an article inside a specific space and delivering the article. The control device includes a storage section configured to store schedule information including at least one of change information including a change region in which a movable region of the automatic movement device is changed in the specific space and a change time at which the region is changed, and operation information including an operation time at which the automatic movement device starts operating; and a processing control section configured to perform processing of preparing a new usage map by adding a change to a reference map of the specific space, based on the schedule information.

11 Claims, 16 Drawing Sheets

(51) Int. Cl.

| | |
|---|---|
| *G06Q 10/08* | (2024.01) |
| *B65G 67/20* | (2006.01) |

(56) References Cited

U.S. PATENT DOCUMENTS

| | | | | |
|---|---|---|---|---|
| 2008/0086262 | A1* | 4/2008 | Asahara | G01C 21/3859 701/452 |
| 2016/0129592 | A1* | 5/2016 | Saboo | B25J 5/007 700/248 |
| 2016/0246301 | A1 | 8/2016 | Kazama et al. | |
| 2019/0025838 | A1* | 1/2019 | Artes | G05D 1/0246 |
| 2021/0256465 | A1* | 8/2021 | Väin | G06Q 10/08355 |

FOREIGN PATENT DOCUMENTS

| | | | |
|---|---|---|---|
| JP | 2014-203145 | A | 10/2014 |
| WO | WO 2019/238865 | A1 | 12/2019 |

* cited by examiner

Fig. 2

| WORK ID | WORK CONTENTS | WORKER | WORK TIME | WORK REGION WORK POSITION (X, Y) | MOVEMENT PATH |
|---|---|---|---|---|---|
| 1 | ARRIVAL DEPARTURE | DELIVERY VEHICLE #1 | : ~: | (*,*)~(*,*) | – |
| 2 | COLLECTION | – | : ~: | (*,*)~(*,*) | – |
| 3 | LOADING | AMR#1 | : ~: | (*,*) → (*,*) | (********) |
| 4 | LOADING | AMR#2 | : ~: | (*,*) → (*,*) | (********) |
| 5 | UNLOADING | AMR#3 | : ~: | (*,*) → (*,*) | (********) |
| 6 | ARRIVAL DEPARTURE | DELIVERY VEHICLE #2 | : ~: | (*,*)~(*,*) | – |
| ⋮ | ⋮ | ⋮ | ⋮ | ⋮ | ⋮ |

| OBSTACLE ID | OBSTACLE REGION | DETECTION TIME | DETECTION DEVICE |
|---|---|---|---|
| 1 | (*,*)~(*,*) | : | AMR#2 |
| 2 | (*,*)~(*,*) | : | AMR#1 |
| ⋮ | ⋮ | ⋮ | ⋮ |

Fig. 6
Fig. 6A
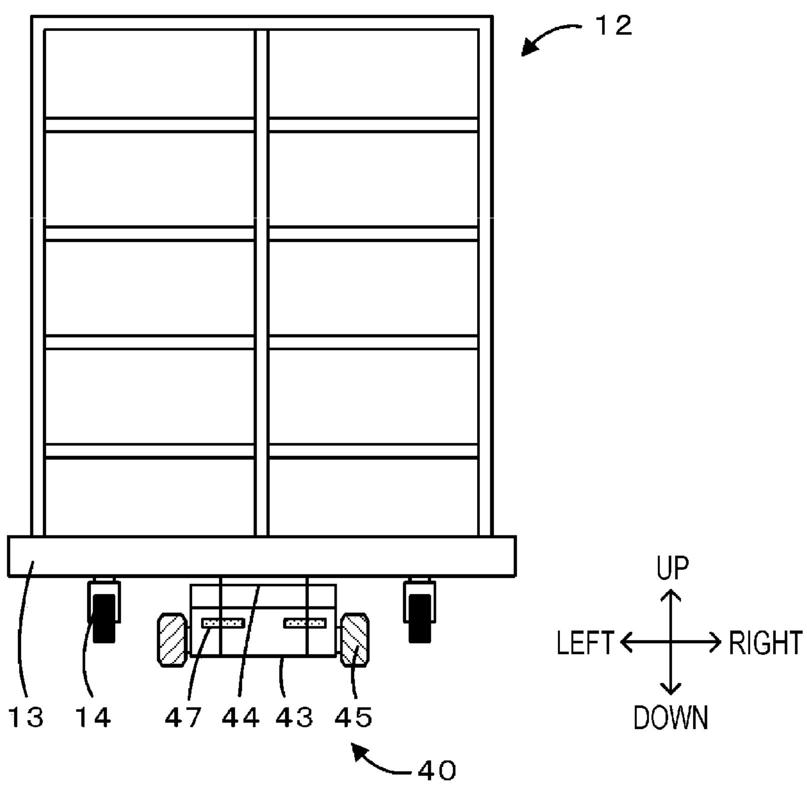
Fig. 6B
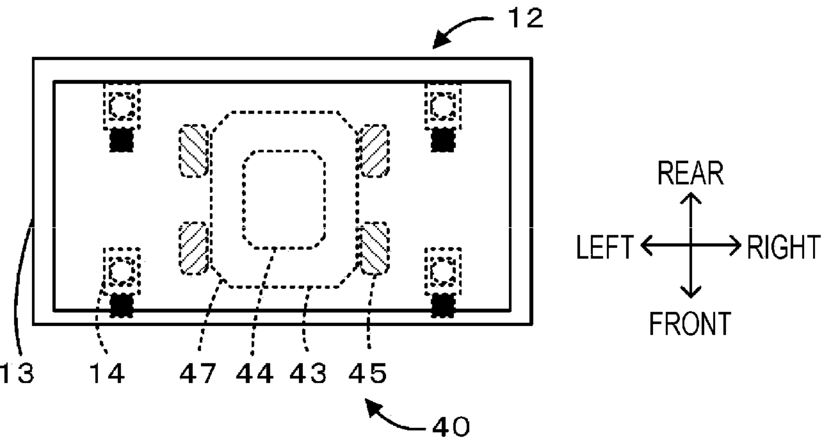

Fig. 8
Fig. 8A
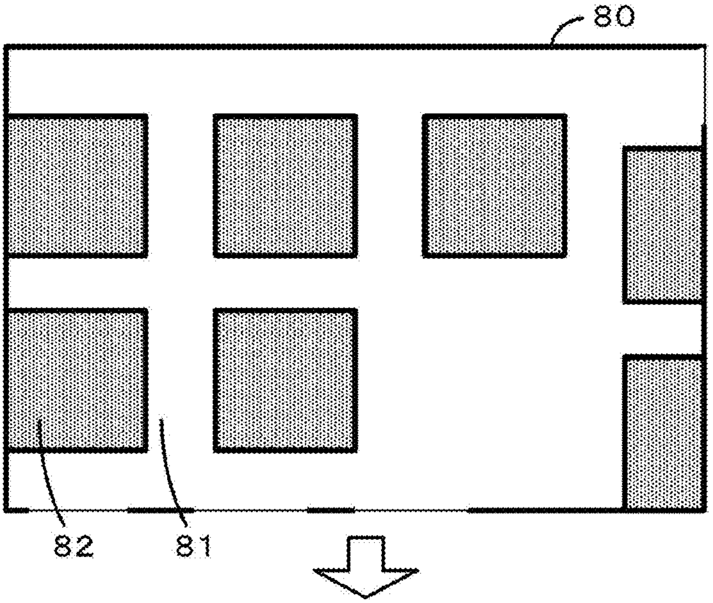
Fig. 8B
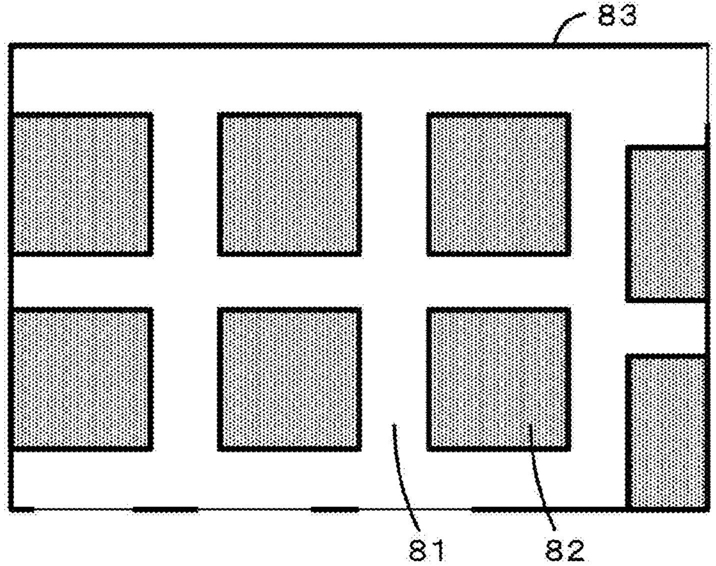

Fig. 9
Fig. 9A
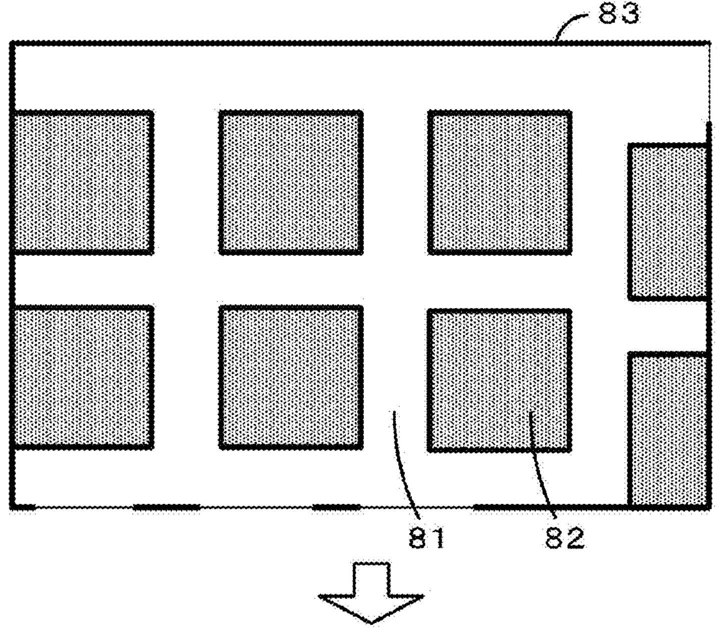
Fig. 9B
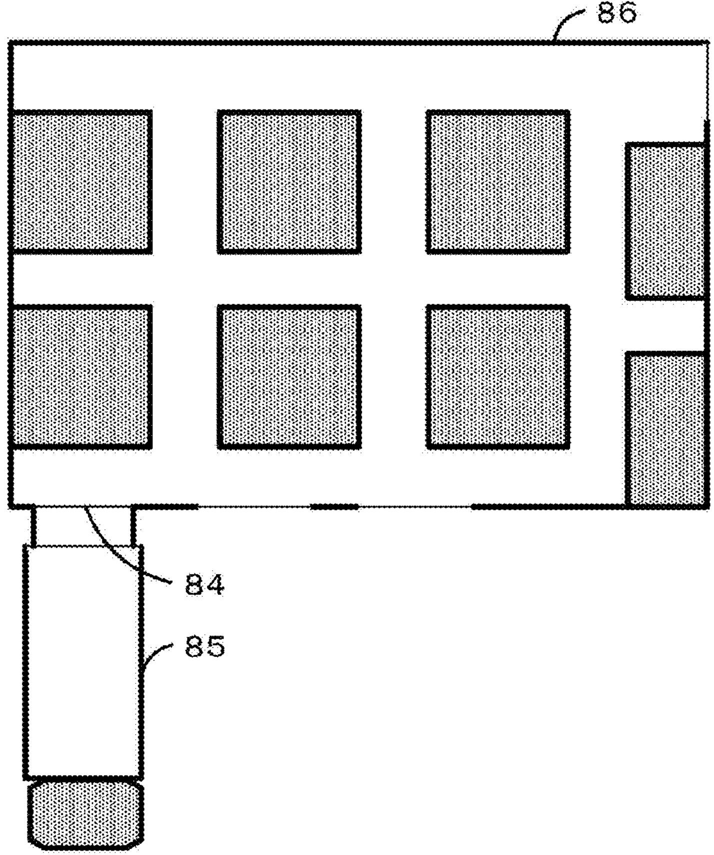

Fig. 10
Fig. 10A
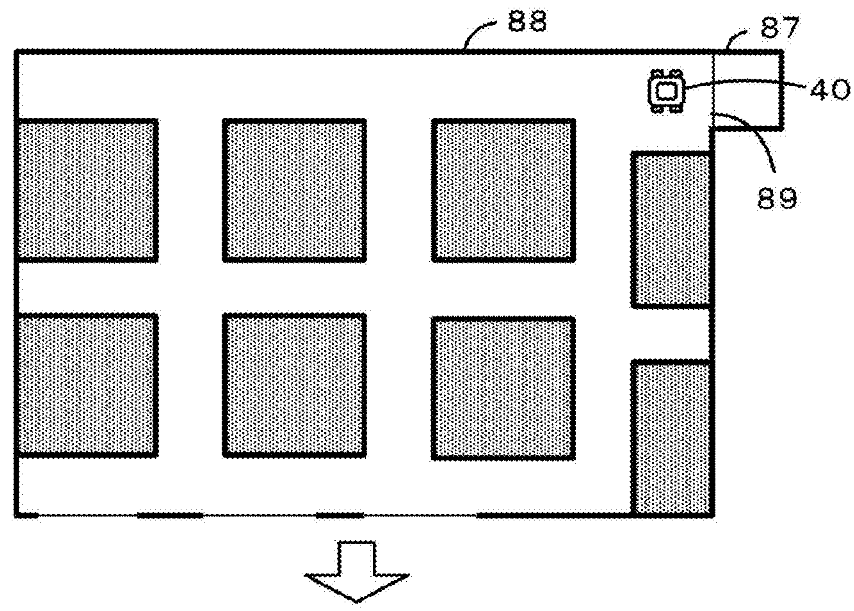
Fig. 10B
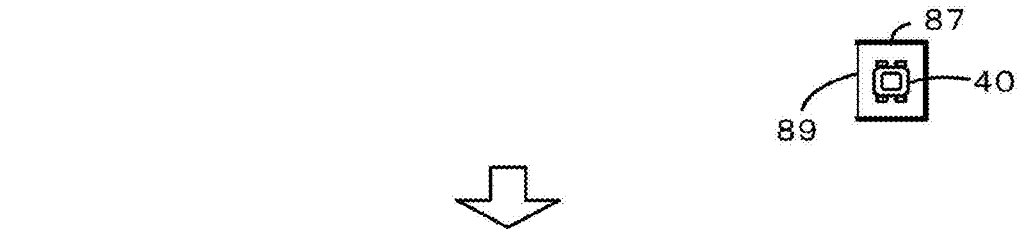
Fig. 10C
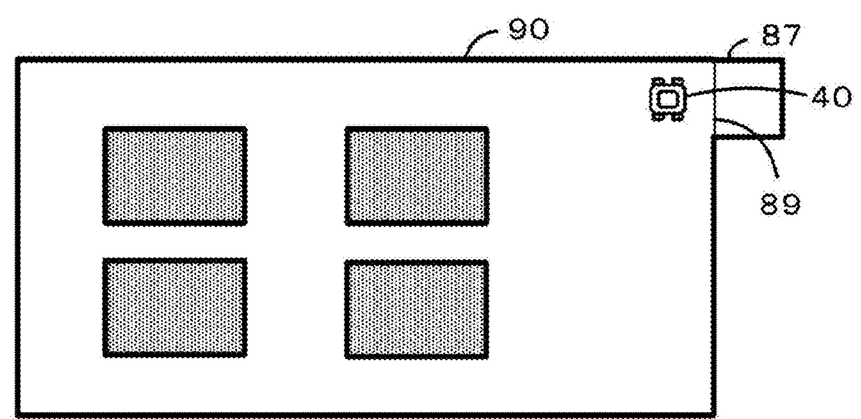

Fig. 14
Fig. 14A
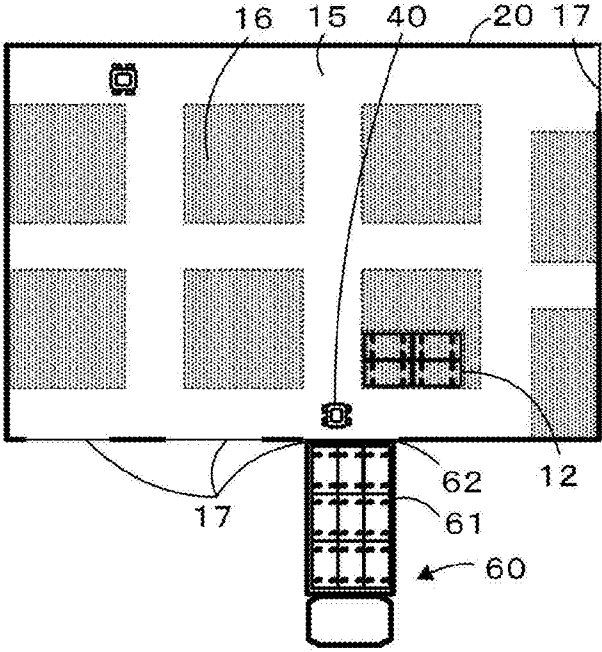
Fig. 14B
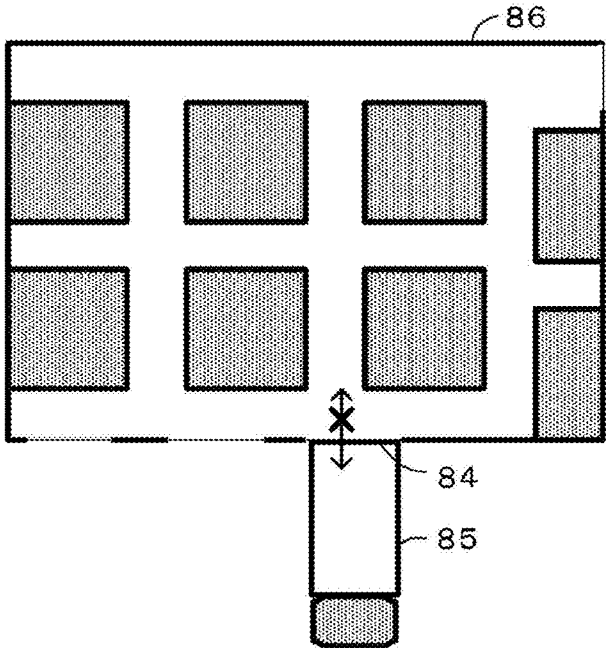

CONTROL DEVICE, DELIVERY SYSTEM, AND CONTROL METHOD

TECHNICAL FIELD

The present specification discloses a control device, a delivery system, and a control method.

BACKGROUND ART

In the related art, a technique has been proposed in a system that automatically moves an article as follows; when one or more robotic devices carry out one or more tasks, in a case where data for developing the task is received, the task is carried out by updating a map, based on the received data (for example, refer to Patent Literature 1). In this system, the article can be moved by using the updated map. In addition, as a control device for preparing the map, a device for setting a connecting point for connecting partial maps by a user's input has been proposed (for example, refer to Patent Literature 2). This device can flexibly cope with a partial layout change.

PATENT LITERATURE

Patent Literature 1: U.S. Patent Publication No. 2016/129592

Patent Literature 2: JP-A-2010-92147

BRIEF SUMMARY

Technical Problem

However, in the system disclosed in Patent Literature 1, when the data for updating the map cannot be obtained, the map may not be updated in some cases. In addition, in the device disclosed in Patent Literature 2, it is necessary for a user to designate the connecting point when connecting the maps. In this way, a delivery system needs to be more smoothly operated when the article is moved.

The present disclosure is made to solve the above-described problems, and a principal object according to the present disclosure is to provide a control device, a delivery system, and a control method which can more smoothly move an article in accordance with a change in situations of a specific space for moving the article.

The present disclosure adopts the following means to achieve the above-described principal object.

According to the present specification, there is provided a control device used in a delivery system having an automatic movement device that automatically moves an article inside a specific space and delivering the article, the control device including a storage section configured to store schedule information including at least one of change information including a change region in which a movable region of the automatic movement device is changed in the specific space and a change time at which the region is changed, and operation information including an operation time at which the automatic movement device starts operating; and a processing control section configured to perform processing of preparing a usage map used by the automatic movement device by adding a change to a reference map of the specific space, based on the schedule information.

The control device performs processing of preparing a new usage map used by the automatic movement device by adding the change to the reference map of the specific space, based on the schedule information including at least one of the change information including the change region in which the movable region of the automatic movement device is changed in the specific space and the change time at which the region is changed, and the operation information including the operation time at which the automatic movement device starts operating. The control device can prepare in advance the usage map closer to an actual state by using the schedule information and considering a situation of the specific space. Therefore, the control device can more smoothly move the article in accordance with a change in the situation of the specific space for moving the article. Here, the "article" is not particularly limited as long as anything is delivered, and for example, examples of the "article" include industrial products including units and components of machines or devices, general consumer products, foods, and fresh products. In addition, for example, examples of the "specific space" include a logistics center or a warehouse where the articles are collected, a shop, and a cargo chamber of a mobile transporter for delivering the articles. Examples of the mobile transporter include an elevator in addition to a vehicle such as an automobile and a train, a ship, and an aircraft. In addition, the "automatic movement device" may be an automatic guided vehicle (AGV) that moves on a predetermined traveling road, or may be an autonomous mobile robot (AMR) that moves on a free route by sensing surroundings.

BRIEF DESCRIPTION OF DRAWINGS

FIG. 2 is an explanatory view illustrating an example of logistics center 20.

FIG. 6 is an explanatory view of automatic movement device 40 connected to carriage 12.

FIG. 8 is an explanatory view for preparing new usage map 83 from usage map 80.

FIG. 9 is an explanatory view for preparing usage map 86 by coupling movement region 85 to usage map 83.

FIG. 10 is an explanatory view for preparing usage map 90 by coupling movement region 87.

DESCRIPTION OF EMBODIMENTS

Figure 1:
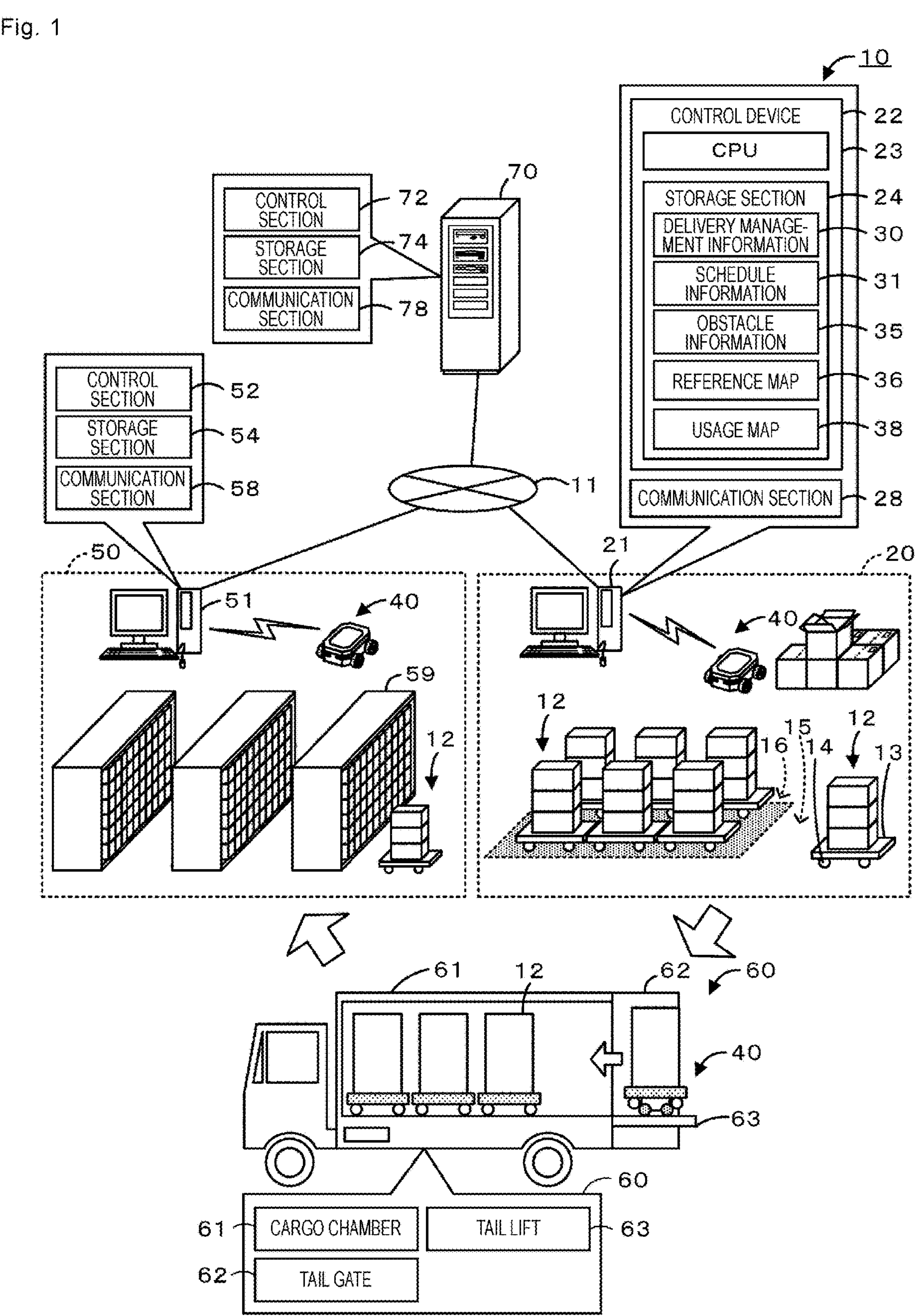
FIG. 1 is a schematic explanatory view illustrating an example of delivery system 10.
Figure 2:
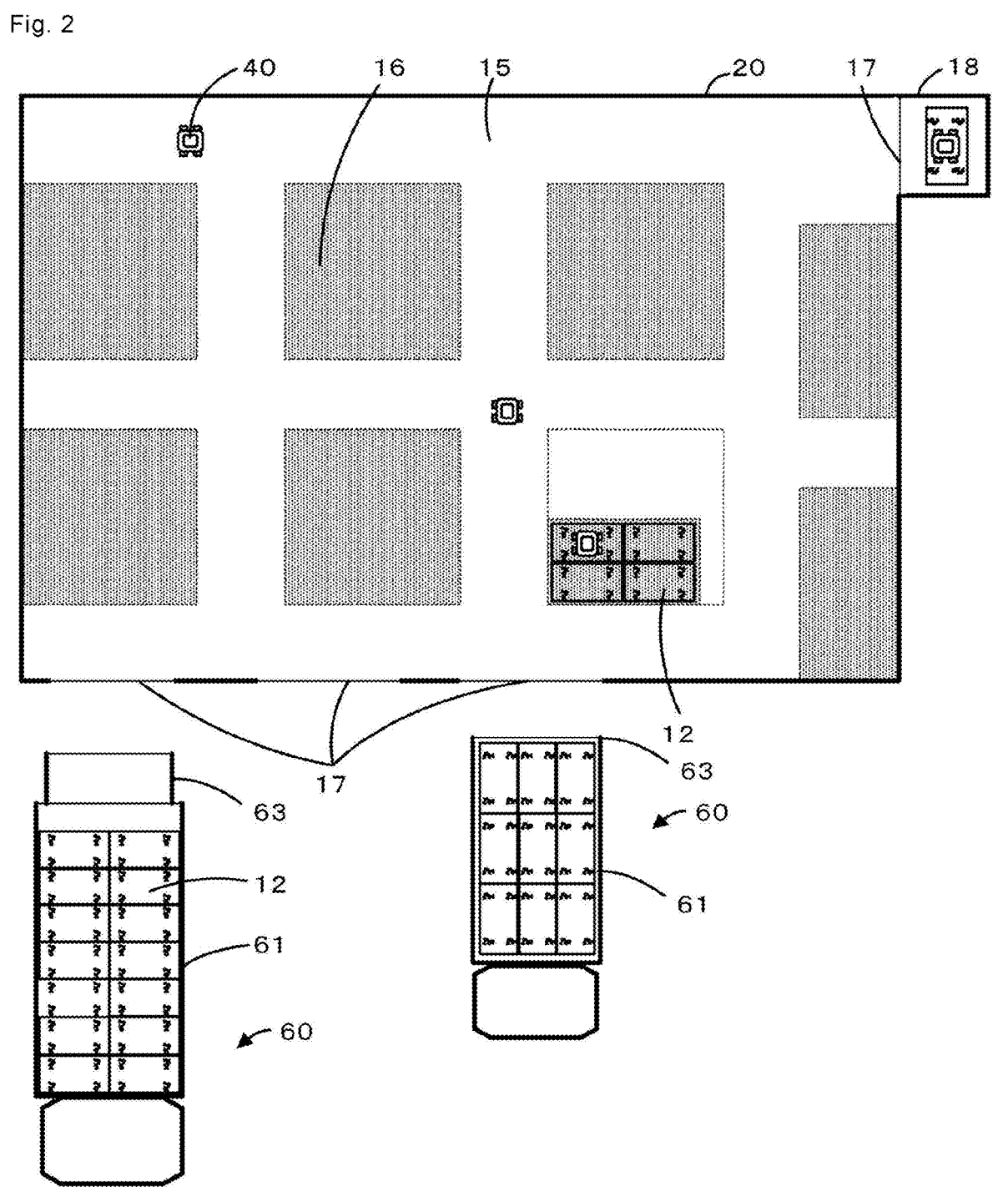
Figure 3:
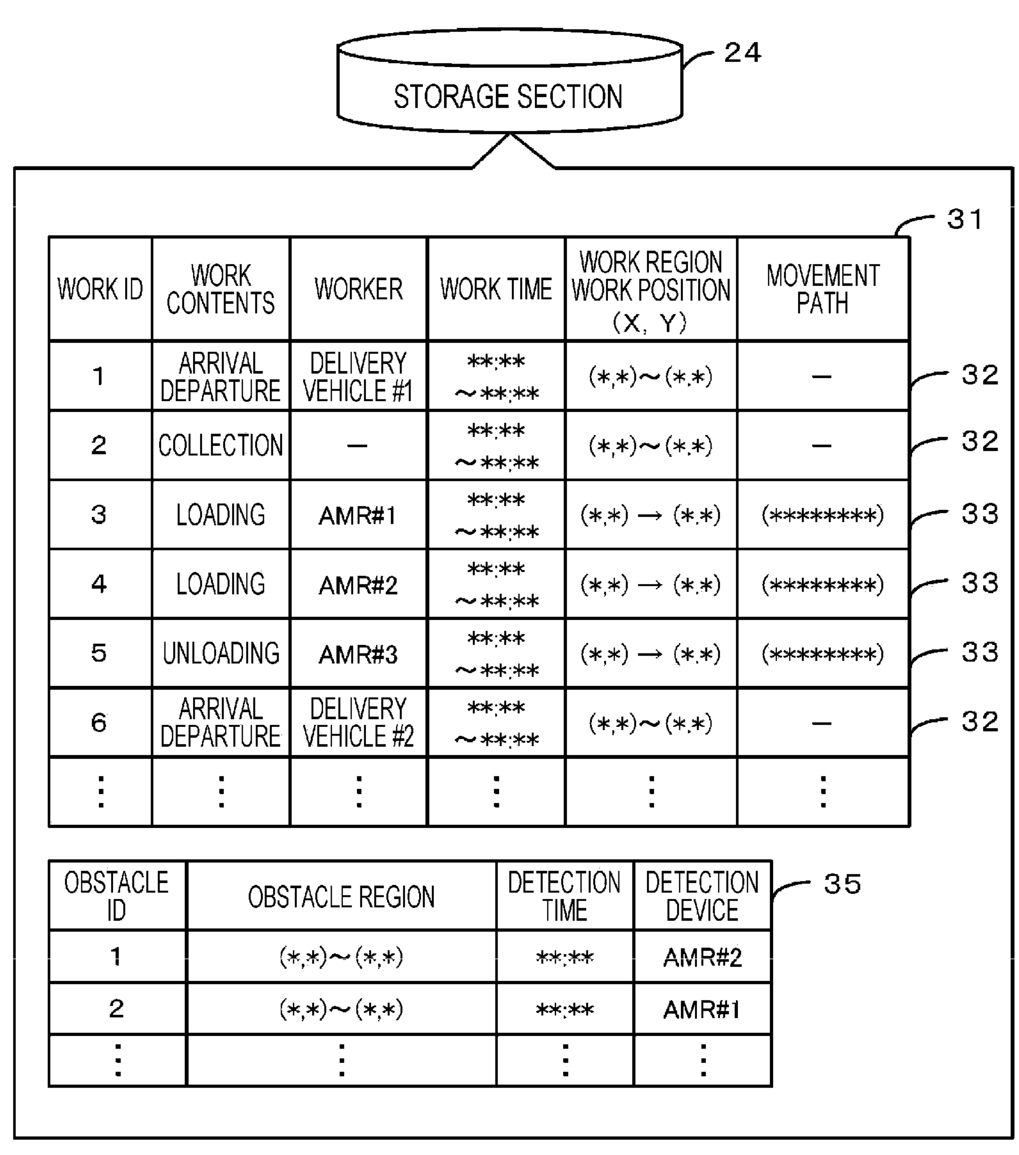
FIG. 3 is an explanatory view illustrating an example of information stored in storage section 24.
Figure 4:
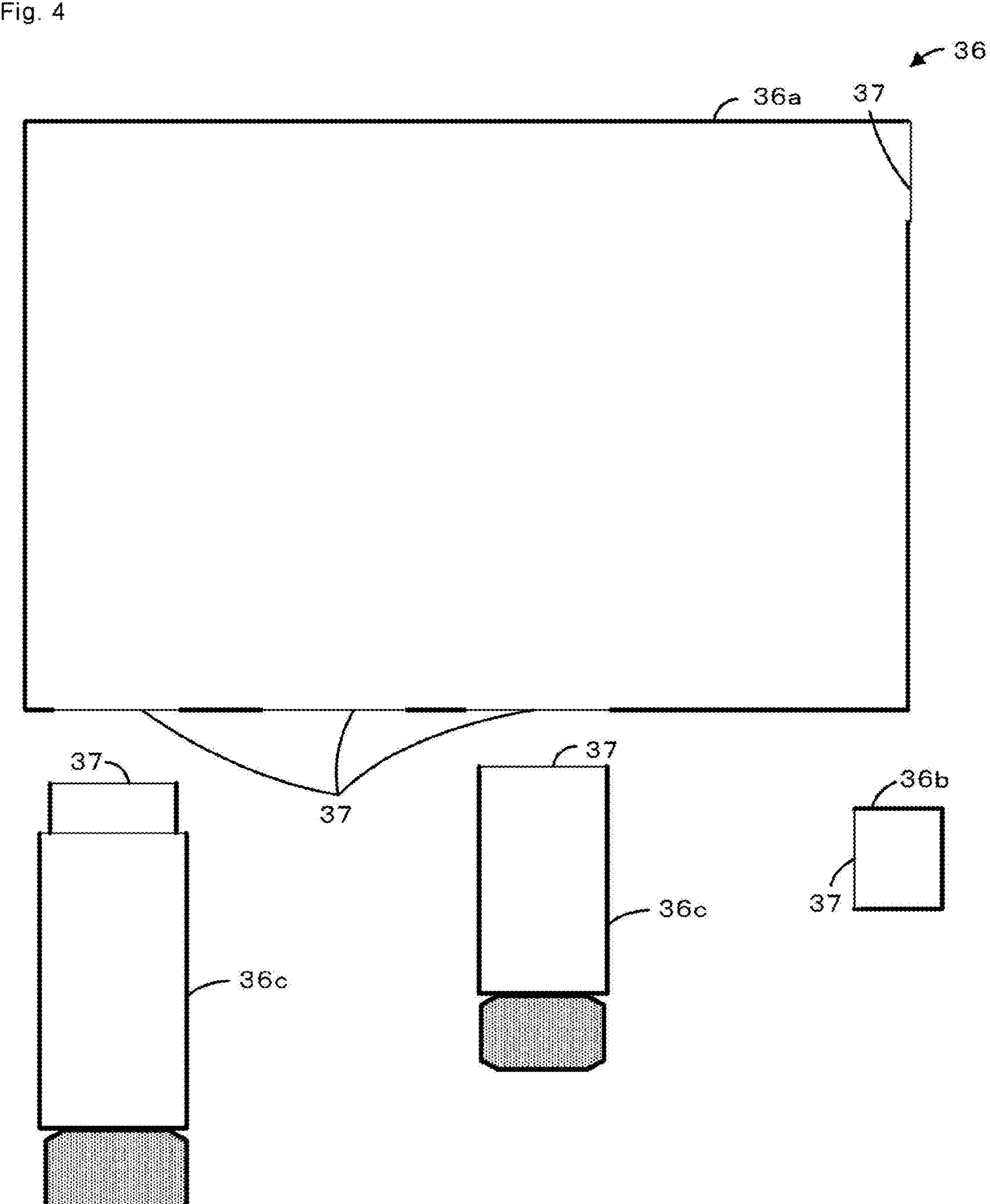
FIG. 4 is an explanatory view illustrating an example of reference map 36.
Figure 5:
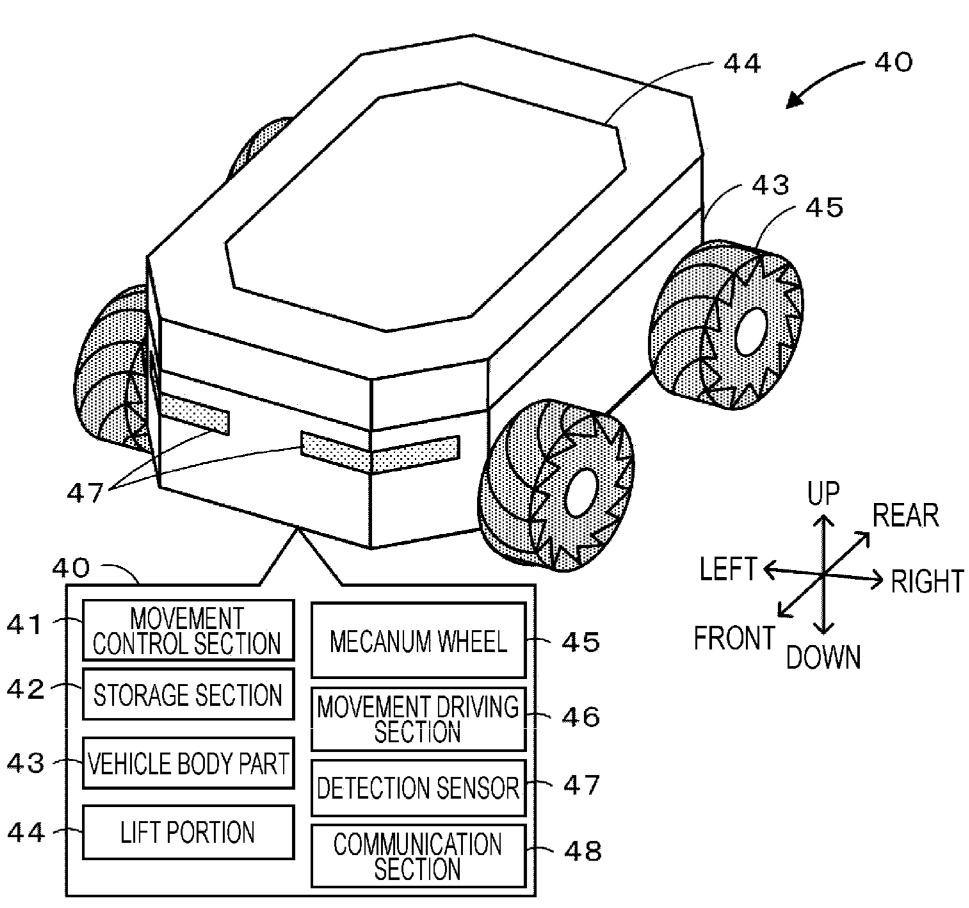
FIG. 5 is an explanatory view illustrating an example of automatic movement device 40.

Embodiments according to the present disclosure will be described with reference to the drawings. FIG. 1 is a schematic explanatory view illustrating an example of delivery system 10. FIG. 2 is an explanatory view illustrating an example of logistics center 20. FIG. 3 is an explanatory view illustrating an example of schedule information 31 and obstacle information 35 which are stored in storage section 24. FIG. 4 is an explanatory view illustrating an example of reference map 36 stored in storage section 24. FIG. 5 is an explanatory view illustrating an example of automatic movement device 40. FIG. 6 is an explanatory view of automatic movement device 40 connected to carriage 12, FIG. 6A is a plan view, and FIG. 6B is a front view. Delivery system 10 is a system having an automatic movement device configured to automatically move an article inside a specific space, and to perform processing of delivering an article. Although delivery system 10 will be described by way of example in which the article is transported by using carriage 12, the present disclosure is not particularly limited to this, and carriage 12 may be omitted or other components may be used. Here, the "article" is not particularly limited as long as anything is delivered, and for example, examples of the "article" include machines, devices, industrial products including units and components of devices, generally used daily consumer products, foods, and fresh products. In addition, for example, examples of a "delivery source" and a "delivery destination" include a logistics center for collecting and delivering the article, a warehouse for storing the article, and a shop for selling the article. In addition, for example, examples of the "specific space" include a cargo chamber of a mobile transporter for delivering the article and work elevator 18 (refer to FIG. 2), in addition to the above-described delivery source and delivery destination. Examples of the mobile transporter include a vehicle such as delivery vehicle 60 and a train, a ship, and an aircraft. Here, for convenience of description, delivery system 10 for delivering commodities such as consumer products and fresh products by using delivery vehicle 60 from logistics center 20 serving as the delivery source to shop 50 serving as the delivery destination will be mainly described. In addition, the "specific space" is logistics center 20. In addition to cargo chamber 61 of delivery vehicle 60, work elevator 18 (refer to FIG. 2) is used. In the present embodiment, a left-right direction, a front-rear direction, and an up-down direction will be described as illustrated in each drawing.

Carriage 12 includes loading section 13 and caster 14. Loading section 13 is a plate-shaped member for loading the article. Caster 14 has wheels for causing carriage 12 to travel, and is disposed on a lower surface side of loading section 13. Carriage 12 may be a basket carriage.

Logistics center 20 is a place for collecting the articles and delivering the articles to shops 50 or other logistics centers 20 in various locations. Logistics center 20 has one or more automatic movement devices 40, and can automatically move carriage 12. For example, logistics center 20 uses a specific region on a floor surface as a collection region corresponding to the delivery destination. In logistics center 20, a worker or an arm robot (not illustrated) carries out work for loading the article on carriage 12 corresponding to the delivery destination. As illustrated in FIG. 2, logistics center 20 includes movable region 15 in which automatic movement device 40 is movable and non-movable region 16 in which automatic movement device 40 is not movable. For example, non-movable region 16 includes a structure such as a column which nothing can physically enter, and a collection region of carriage 12. In addition, logistics center 20 has doorway 17 and work elevator 18. Doorway 17 is a boundary that communicates with the outside, but automatic movement device 40 cannot basically enter doorway 17. Doorway 17 is an opening portion through which delivery vehicle 60 is laid down to load and unload the articles, or in which work elevator 18 is disposed to enable the articles to move to another floor. Automatic movement device 40 carries out work for collecting, loading, and unloading carriage 12 for which a delivery destination is specified. Delivery vehicle 60 loads carriage 12 in cargo chamber 61 in logistics center 20, delivers the articles to the delivery destination, and returns empty carriage 12 to logistics center 20.

Shop 50 displays and sells the delivered articles. Shop 50 has one or more automatic movement devices 40, and can automatically move carriage 12. Shop 50 has display shelf 59 on which the articles are displayed, and a worker displays the articles on the display shelf.

As illustrated in FIG. 1, delivery system 10 is configured to include logistics PC 21, shop PC 51, automatic movement device 40, and management server 70. Logistics PC 21 is disposed in logistics center 20, and performs commodity management in logistics center 20. Logistics PC 21 includes control device 22, storage section 24, and communication section 28. Control device 22 has CPU 23, and controls the whole device. Storage section 24 stores various application programs and various data files. Communication section 28 communicates with an external device such as automatic movement device 40. Communication section 28 exchanges information with management server 70 or shop PC 51 via network 11.

As illustrated in FIGS. 1 and 3, storage section 24 stores delivery management information 30, schedule information 31, obstacle information 35, reference map 36, and usage map 38. For example, delivery management information 30 includes delivery information in which the delivery destination and the article are associated with each other, correspondence information in which carriage 12 on which the article is loaded and the article are associated with each other. As illustrated in FIG. 3, schedule information 31 includes information on a work schedule in which a work content, a worker, a work time, a work region, a work position, and a movement path of automatic movement device 40 are associated with each other. Schedule information 31 includes change information 32 and operation information 33. Change information 32 is information including a change region in which a movable region of automatic movement device 40 is changed in a specific space and a change time at which the region is changed. For example, change information 32 includes information on a region where carriages 12 are collected in a specific delivery destination and a time at which the region is set, and information on a time at which delivery vehicle 60 arrives at predetermined doorway region 37 and a time at which delivery vehicle 60 departs from predetermined doorway region 37. Operation information 33 includes an operation time at which automatic movement device 40 starts operating, a position of a movement source, a position of a movement destination of the article, and a movement path thereof. Obstacle information 35 includes information on a position or a size of an obstacle existing inside logistics center 20 and obstructing the movement of automatic movement device 40, and additionally includes information on a device or a time used when the obstacle is detected. Obstacle information 35 is sequentially updated by automatic movement device 40 moving on a floor. The information on the obstacle included in obstacle information 35 is thereafter deleted when the obstacle disappears.

Reference map 36 is a basic map of a region of automatic movement device 40 relating to logistics center 20. As illustrated in FIG. 4, reference map 36 includes floor map **36*a* of logistics center 20 illustrated in FIG. 2, floor map 36*b* of work elevator 18, and floor map 36*c* of the cargo chamber of delivery vehicle 60. Floor maps 36*a* to 36*c* include doorway region 37 through which outward passage is allowable. Floor maps 36***b* and 36*c* are movement regions that are relatively moved to, coupled to, and separated from floor map 36*a*. Usage map 38 is a map used when automatic movement device 40 moves in logistics center 20. Usage map 38 is a map obtained as follows in reference map 36; a current state where automatic movement device 40 coupled to newly prepared non-movable region 16 or the movement region is currently movable is reflected on reference map 36 (refer to FIGS. 8 and 9 to be described later). Usage map 38 is prepared by logistics PC 21, is transmitted to automatic movement device 40, and is used by automatic movement device 40.

Shop PC 51 is disposed in shop 50, and performs commodity management in shop 50. Shop PC 51 includes control section 52, storage section 54, and communication section 58. Control section 52 has a CPU, and controls the whole device. Storage section 54 stores various application programs and various data files. Communication section 58 communicates with an external device such as automatic movement device 40. Communication section 58 exchanges information with management server 70 and logistics PC 21 via network 11. Storage section 54 stores commodity management information in which the article and the display shelf are associated with each other, schedule information, and a reference map or a usage map used by automatic movement device 40. Storage section 54 may include the same contents as schedule information 31, obstacle information 35, reference map 36, and usage map 38 which are stored in logistics PC 21.

Automatic movement device 40 is a vehicle that automatically moves carriage 12. Automatic movement device 40 enters a space formed with caster 14 on a lower surface side of loading section 13 of carriage 12, connects loading section 13 to carriage 12 by lifting loading section 13 from below with lift portion 44, and moves carriage 12. Automatic movement device 40 may be an automatic guided vehicle (AGV) that moves on a predetermined traveling road, or may be an autonomous mobile robot (AMR) that moves on a free route by sensing surroundings. Here, an automatic movement device 40 having a configuration of the AMR will be described.

As illustrated in FIG. 5, automatic movement device 40 includes movement control section 41, storage section 42, vehicle body part 43, lift portion 44, mecanum wheel 45, movement driving section 46, detection sensor 47, and communication section 48. Movement control section 41 is a controller for controlling the whole device of automatic movement device 40. Movement control section 41 outputs a control signal to lift portion 44, movement driving section 46, or communication section 48, and inputs an input signal from detection sensor 47 and communication section 48. Movement control section 41 recognizes a movement direction, a movement distance, a current position of automatic movement device 40, based on a drive state of movement driving section 46. Storage section 42 stores various application programs and various data files. For example, storage section 42 stores schedule information 31 for moving carriage 12, and usage map 38 of logistics center 20. The schedule information and the map data are acquired by communication from logistics PC 21. Lift portion 44 is connected to carriage 12 by lifting and pushing up a lower surface of loading section 13 with respect to vehicle body part 43 of automatic movement device 40 (refer to FIG. 6). Mecanum wheel 45 has a structure in which multiple rollers pivotally supported to be freely rotatable at an inclination angle of 45° with respect to a vehicle axle are disposed on a grounding surface side. Automatic movement device 40 includes four mecanum wheel 45, and is configured to be capable of moving automatic movement device 40 in all directions, super-fuzzy terrain turning, fuzzy terrain turning, slow turning by independently rotating respective mecanum wheels 45 in a front direction or a rear direction. Movement driving section 46 is a motor connected to respective mecanum wheels 45 and rotationally driving connected mecanum wheel 45 to drive automatic movement device 40 to travel. Detection sensor 47 detects an object existing around automatic movement device 40 or a distance from the object. For example, detection sensor 47 detects the existence of the object or the distance from the object by irradiating the surroundings with light such as a laser, or a sound wave and detecting a reflected wave. Movement control section 41 controls automatic movement device 40 to move or stop, based on information from detection sensor 47. Communication section 48 wirelessly exchanges information with an external device such as logistics PC 21. Movement control section 41 moves to a position of carriage 12 based on a command obtained from logistics PC 21 via communication section 48, is connected to carriage 12, and thereafter, moves carriage 12 to a movement destination position along a set movement path.

Delivery vehicle 60 is a vehicle that loads and delivers one or more carriages 12. As illustrated in FIG. 1, delivery vehicle 60 includes cargo chamber 61, tail gate 62, and tail lift 63. Cargo chamber 61 is a specific space in which carriages 12 are collected. Tail gate 62 is provided in a rear part of a vehicle, and opens and closes cargo chamber 61 by a closing door. Tail lift 63 loads carriage 12 or a worker on a work table which is horizontal when the closing door is opened, and moves the work table up and down between a floor surface of cargo chamber 61 and a traveling surface of delivery vehicle 60. In delivery vehicle 60, tail gate 62 and tail lift 63 can be mechanically operated by a motor or a hydraulic pressure. In the present embodiment, carriage 12 is delivered by delivery vehicle 60 of the truck, but a configuration is not particularly limited to this, and may be delivered by a mobile transporter such as a train, a ship, and an aircraft.

Management server 70 is a device that manages delivery system 10. Management server 70 includes control section 72, storage section 74, and communication section 78. Control section 72 has a CPU, and controls the whole device. Storage section 74 stores various application programs and various data files. Storage section 74 stores delivery management information used for managing the delivery of the articles, carriage information for managing carriage 12 used in logistics center 20 or shop 50, and a reference map of logistics center 20 or shop 50. The delivery management information includes delivery information in which the delivery destination and the article are associated with each other, correspondence information in which carriage 12 on which the article is loaded and the article are associated with each other. The schedule information includes information on a work schedule in which a work content, a worker, a work time, a work region, a work position, and a movement path of automatic movement device 40 are associated with each other. Communication section 78 exchanges information with an external device such as logistics PC 21 and shop PC 51 via network 11.

Figure 7:
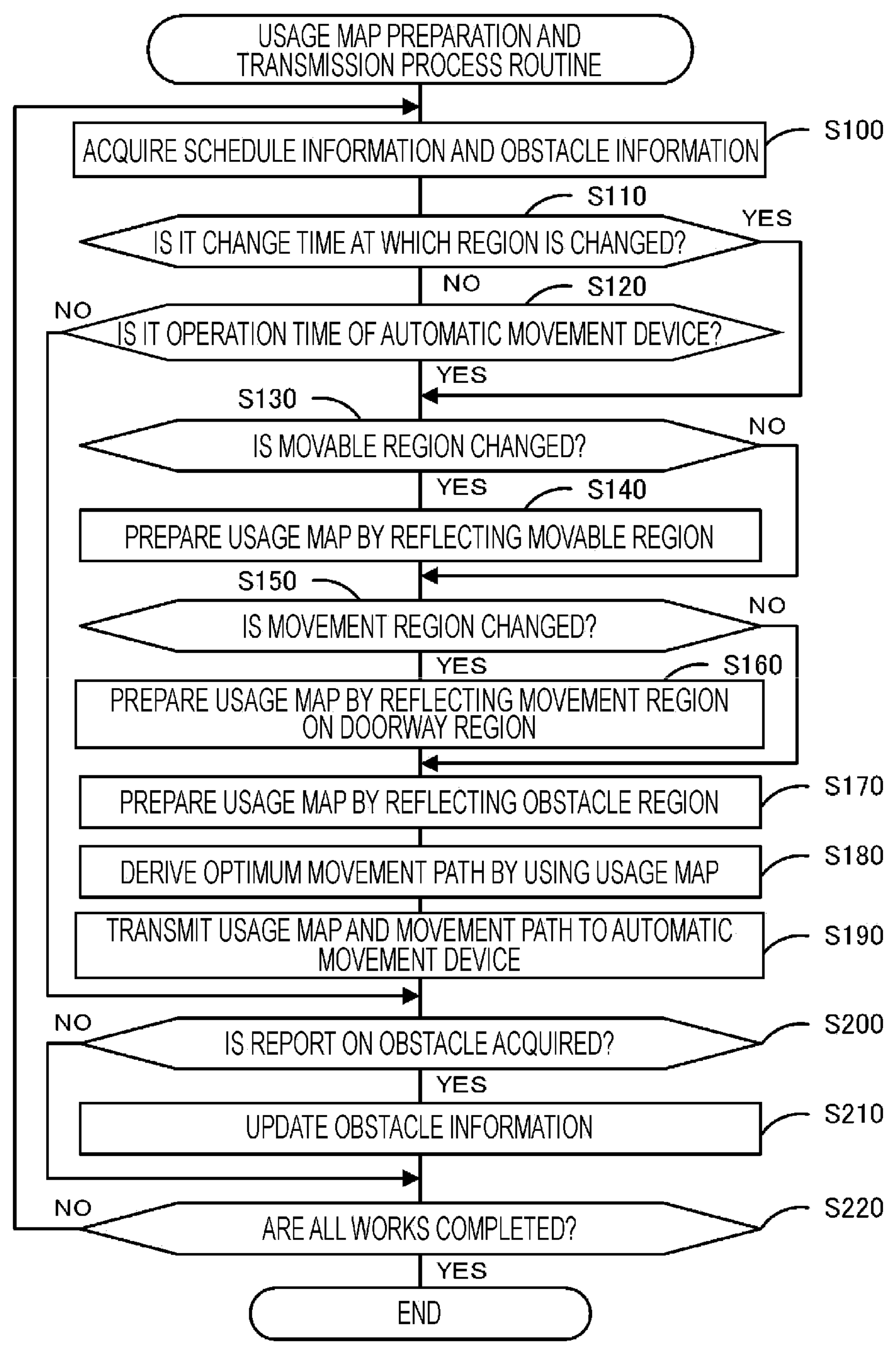
FIG. 7 is a flowchart illustrating an example of a usage map preparation and transmission processing routine.

Next, in delivery system 10 configured in this way, processing of updating non-movable region 16, coupling the movement region, and preparing usage map 38 on which the current state is reflected will be described. FIG. 7 is a flowchart illustrating an example of a usage map preparation and transmission processing routine performed by control device 22 of logistics PC 21. The routine is stored in storage section 24 of control device 22, and is performed from when logistics center 20 starts work. When the routine starts, CPU 23 acquires schedule information 31 from management server 70, reads and acquires obstacle information 35 from storage section 24 (S100), and determines whether a current time is a time at which the region is changed, based on schedule information 31 (S110). Here, of example, the "time at which the region is changed" may be a time based on the time at which the region is changed, or may be before a predetermined time in a change time (for example, 2 minutes before, 5 minutes before, or 10 minutes before), or may be just the change time, or after a predetermined time after the change time elapses (for example, 1 minute after or 2 minutes after). In addition, the "region is changed" includes a case where movable region 15 is changed to non-movable region 16 within a predetermined range, and a case where non-movable region 16 is changed to movable region 15. For example, the examples include a case where a collection region of carriage 12 to a specific delivery destination is set on the floor and a case where the collection region is canceled from the floor.

When the current time is not the change time at which the region is changed, CPU 23 determines whether the current time is an operation time at which any one of automatic movement devices 40 starts operating, based on schedule information 31 (S120). For example, the "operation time at which the operation starts" may be a time based on an operation start time, or for example, may be before a predetermined time in the operation time (for example, 2 minutes before, 5 minutes before, or 10 minutes before), or may be just the operation time, or after a predetermined time after the operation time elapses (for example, 1 minute after or 2 minutes after). When the current time is the operation time or when the current time is the change time in S110, CPU 23 determines whether there is a change in movable region 15 at the current time (S130). When there is a change in movable region 15, CPU 23 prepares usage map 38 in which changed movable region 15 is reflected on reference map 36 (S140).

Here, usage map 38 in logistics center 20 where automatic movement device 40 carries out work will be described with reference to a specific example. FIG. 8 is an explanatory view of preparing new usage map 83 from usage map 80, FIG. 8A is an explanatory view of usage map 80, and FIG. 8B is an explanatory view of usage map 83. For example, when floor map 36*a* illustrated in FIG. 4 is set as reference map 36, CPU 23 reflects the current situation on floor map 36*a*, and prepares usage map 80 including movable region 81 and non-movable region 82 (FIG. 8A). Next, when the current time reaches the change time or the operation time, CPU 23 reflects the current situation, and prepares usage map 83 including new non-movable region 82 (FIG. 8B). Here, when preparing usage map 83, CPU 23 may reflect all of the current situations on reference map 36 each time, or may reflect a change on previous usage map 80 including reference map 36.

On the other hand, after S140 or when movable region 15 is not changed in S130, CPU 23 determines whether the movement region is changed (S150). Here, the "movement region is changed" includes any one of whether the movement region (for example, delivery vehicle 60) is coupled to logistics center 20 and whether the movement region is separated from logistics center 20. When the movement region is changed, CPU 23 prepares usage map 38 by reflecting the movement region on doorway region 37 (S160).

Here, usage map 38 of logistics center 20 where automatic movement device 40 carries out work will be described with reference to a specific example. FIG. 9 is an explanatory view for preparing usage map 86 by coupling movement region 85 to usage map 83, FIG. 9A is an explanatory view of usage map 83, and FIG. 9B is an explanatory view of usage map 86. For example, CPU 23 reflects the current situation on floor map 36*a*, and prepares usage map 83 including movable region 81 and non-movable region 82 (FIG. 9A). Next, when the current time reaches the change time or the operation time, CPU 23 prepares usage map 86 in which movement region 85 is coupled to doorway region 84 by reflecting the current situation (FIG. 9B). Here, CPU 23 determines that delivery vehicle 60 is in contact with doorway 17 determined in advance in schedule information 31, CPU 23 couples movement region 85 to predetermined doorway region 84 in accordance with the determination. When preparing usage map 86, CPU 23 may reflect all of the current situations on reference map 36 each time, or may reflect the change in previous usage map 83 including reference map 36.

In addition, switching the maps of work elevator 18 serving as the movement region will be described. FIG. 10 is an explanatory view for preparing usage map 90 by coupling movement region 87 of work elevator 18, FIG. 10A is an explanatory view of usage map 88, FIG. 10B is an explanatory view of movement region 87, and FIG. 10C is an explanatory view of usage map 90. In FIG. 10, automatic movement device 40 is illustrated for convenience of description. When automatic movement device 40 waits for work elevator 18 in doorway region 89, CPU 23 prepares usage map 88 by coupling movement region 87 to doorway region 89 (FIG. 10A). Next, when automatic movement device 40 rides on work elevator 18 and moves to another floor, the floor map of logistics center 20 is separated as the movement region, and movement region 87 is set as the floor map (FIG. 10B). When arriving at another floor, usage map 90 is prepared by coupling the floor map of another floor to movement region 87 in doorway region 89 (FIG. 10C). In this way, CPU 23 appropriately moves automatic movement device 40 by switching the maps in work elevator 18.

Figure 11:
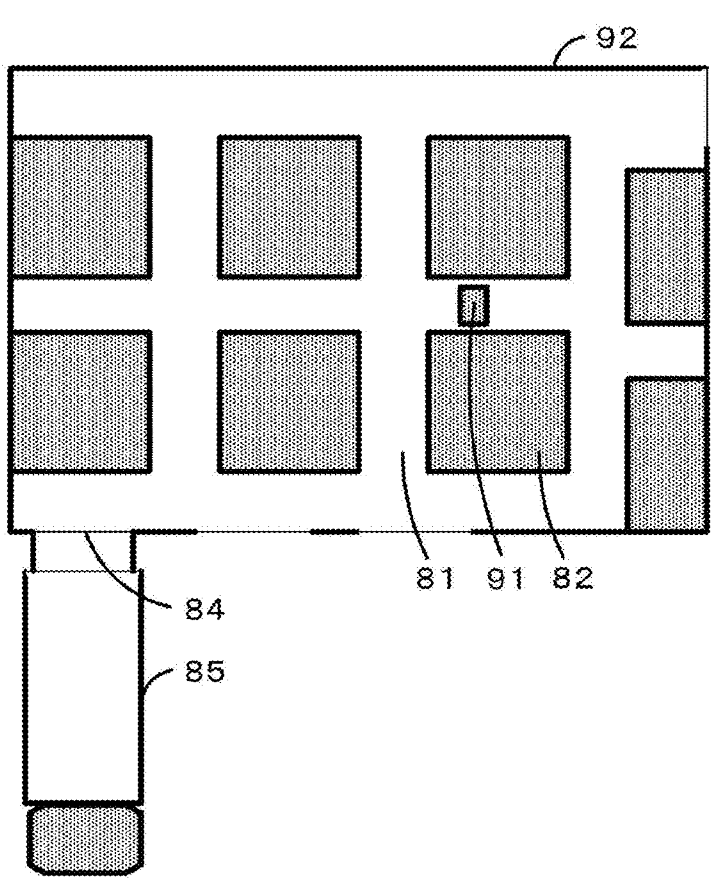
FIG. 11 is an explanatory view for preparing usage map 92 by adding obstacle region 91.

After S160, based on information in obstacle information 35, CPU 23 prepares usage map 38 on which an obstacle region is further reflected (S170), and derives an optimum movement path by using prepared usage map 38 (S180). CPU 23 may reflect the optimum movement path on schedule information 31. Subsequently, CPU 23 transmits prepared usage map 38 and the derived movement path to automatic movement device 40 (S190). CPU 23 prepares usage map 38 on which the current situation is further reflected by giving priority to the information on the obstacle existing in the specific space. In obstacle information 35, the information on the currently existing obstacle is sequentially updated. FIG. 11 is an explanatory view for preparing usage map 92 by adding obstacle region 91. In FIG. 11, obstacle region 91 is added to usage map 86 (FIG. 9). In this way, CPU 23 can provide usage map 92 closer to the current specific space by reflecting newly changed non-movable region 82, newly coupled movement region 85, and locally detected obstacle region 91.

Figures 12, 12A:
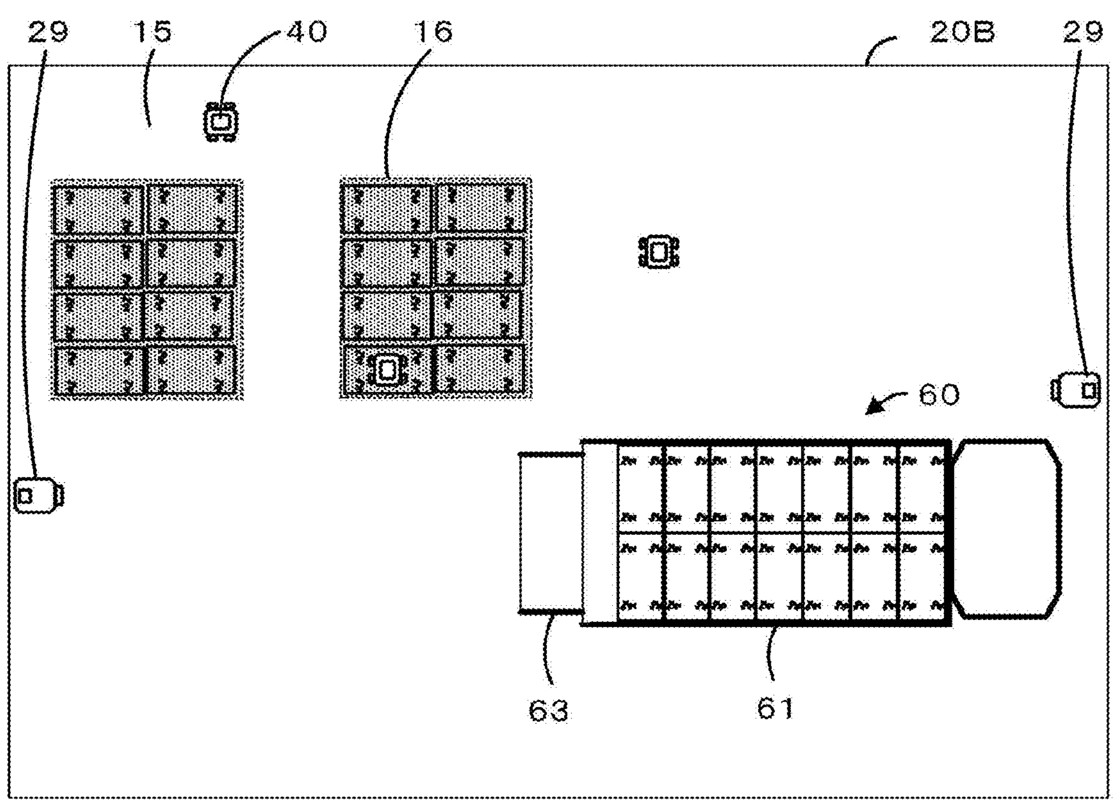
FIG. 12 is an explanatory view of an example of another logistics center 20B.
Figure 12B:
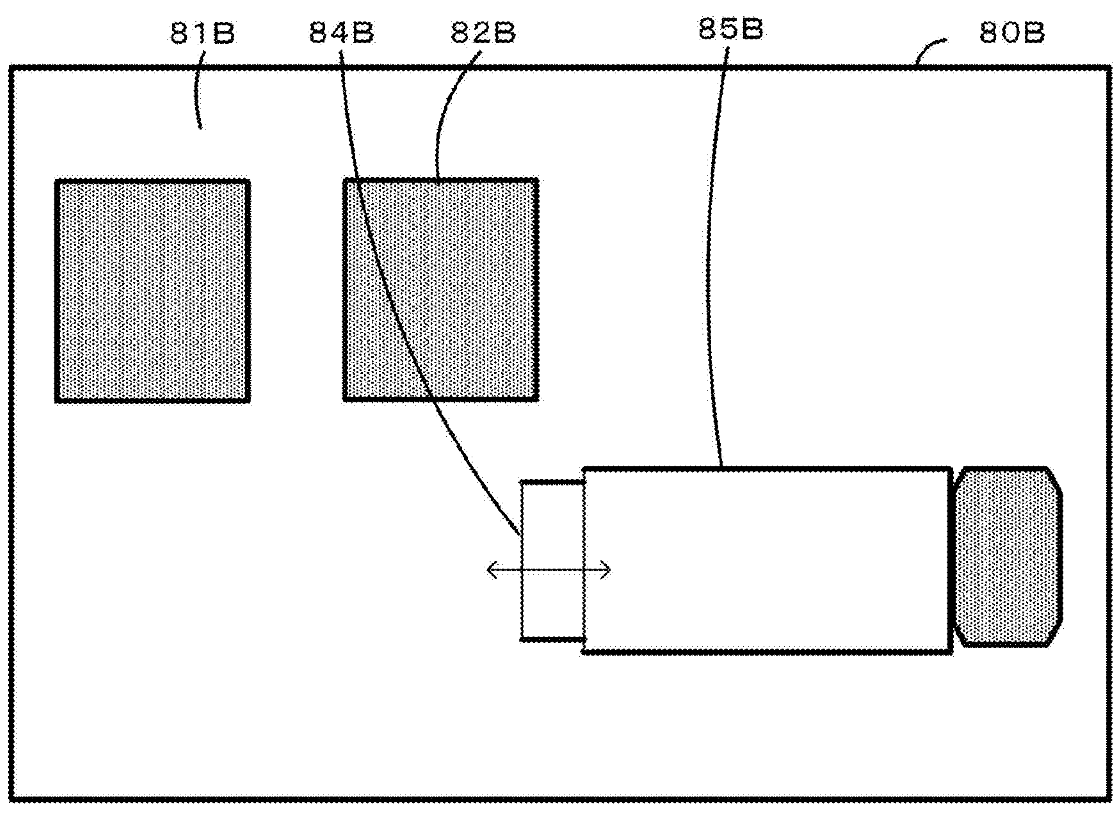

In addition, here, processing in another logistics center 20B will be described. Logistics center 20B is configured to include an internal open space which delivery vehicle 60 enters. FIG. 12 is an explanatory view of an example of another logistics center 20B, FIG. 12A is an explanatory view of logistics center 20B, and FIG. 12B is an explanatory view of usage map 80B. One or more region detection devices 29 for detecting positions of collected carriages 12 and delivery vehicle 60 are disposed in logistics center 20B. Region detection device 29 may be a non-contact sensor, or may be a camera. In logistics center 20B, CPU 23 detects the positions of delivery vehicle 60 and collected carriages 12 by region detection device 29, reflects non-movable region 82B and movement region 85B on the floor map, and prepares usage map 80B. In usage map 80B, the movement into movement region 87B is available from only doorway region 84B. In this way, CPU 23 may prepare usage map 80B including movement region 85B inside reference map 36. CPU 23 can properly secure the movement of automatic movement device 40 by using usage map 80B.

After S190 or when the time is not the change time in S110 and is not the operation time in S120, CPU 23 determines whether a report on an obstacle is acquired from any one of automatic movement devices 40 (S200). During the work on the floor, when detecting the existence of a new obstacle and a fact that the obstacle is removed, automatic movement device 40 transmits a report thereof to logistics PC 21. When receiving the report, CPU 23 updates obstacle information 35 (S210). After S210 or when the report on the obstacle is not received in S200, CPU 23 determines whether all of the works are completed (S220), and performs the processing subsequent to S100 when all of the works are not completed. That is, based on schedule information 31, when the times reach the change time and the operation time, CPU 23 prepares new usage map 38, and transmits usage map 38 to automatic movement device 40. On the other hand, when all of the works are completed in S220, the routine is completed.

Figure 13:
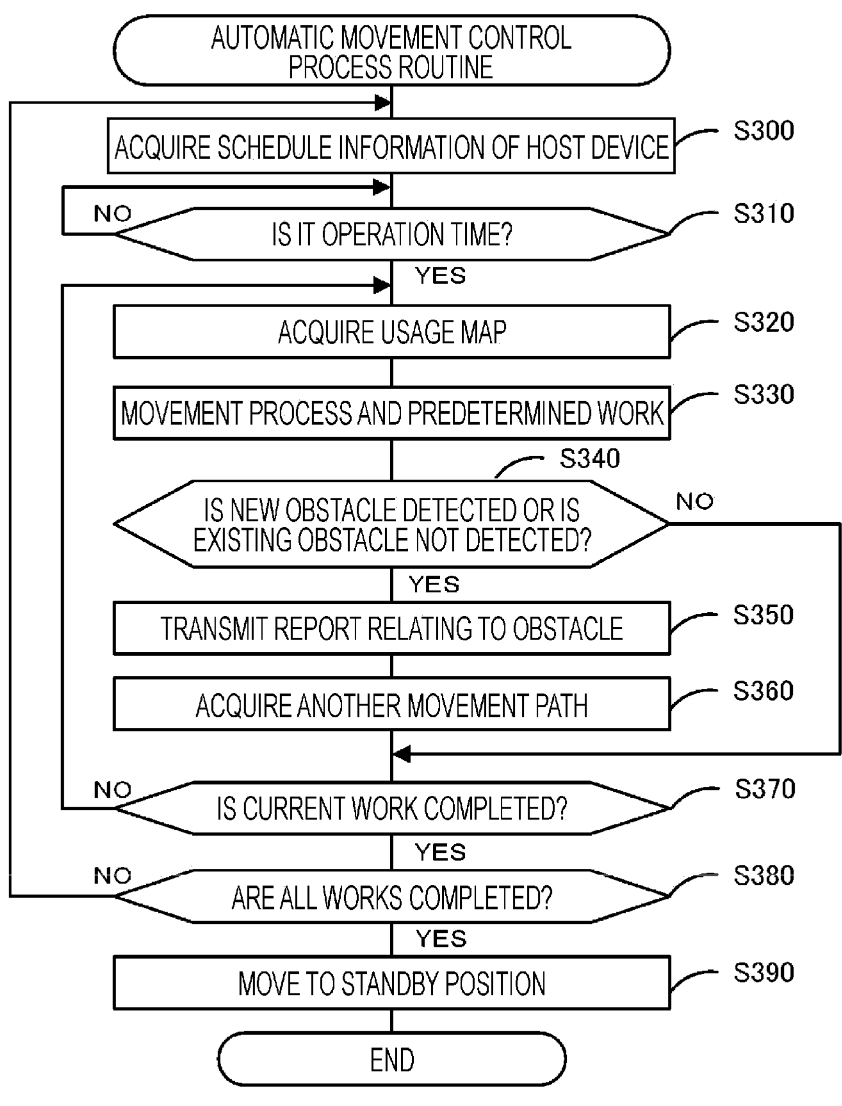
FIG. 13 is a flowchart illustrating an example of an automatic movement control processing routine.

Next, processing performed by automatic movement device 40 to move carriage 12 in logistics center 20 will be described. FIG. 13 is a flowchart illustrating an example of an automatic movement control processing routine performed by movement control section 41 of automatic movement device 40. The routine is stored in storage section 42, and is performed after automatic movement device 40 is activated. When the routine starts, movement control section 41 acquires schedule information 31 of a host device from logistics PC 21 (S300), and waits until the current time reaches the operation time (S310). When the current time reaches the operation time, movement control section 41 acquires usage map 38 transmitted from logistics PC 21 (S320), and performs a movement processing and predetermined work, based on schedule information 31 (S330). In the movement processing, for example, movement control section 41 moves to a movement source position of carriage 12, and moves carriage 12 to a movement destination position. In the predetermined work, connection and disconnection are performed by moving lift portion 44 up and down in a lower portion of carriage 12. In S340, while the processing in S330 is continued, movement control section 41 determines whether a new obstacle is detected by detection sensor 47 or an existing obstacle is not detected. When the new obstacle is detected or the existing obstacle is not detected, movement control section 41 transmits a report relating to the obstacle to logistics PC 21 (S350), and acquires another movement path from logistics PC 21 (S360). After S360 or when the new obstacle is not detected or the existing obstacle is detected in S340, movement control section 41 determines whether the work based on current schedule information 31 is completed (S370). When the current work is not completed, movement control section 41 performs the processing subsequent to S320. Latest usage map 38 is transmitted from logistics PC 21 each time the current time reaches the change time, and movement control section 41 performs the movement processing by using latest usage map 38. On the other hand, when the current work is completed in S370, movement control section 41 determines whether all of the works are completed (S380). When all of the works are not completed, movement control section 41 performs the processing subsequent to S300, and when all of the works are completed, movement control section 41 moves to a standby position (S390), and completes the routine. In this way, automatic movement device 40 moves carriage 12 while using latest usage map 38.

Here, a correspondence between configuration elements of the present embodiment and configuration elements according to the present disclosure will be clarified. Logistics center 20, shop 50, work elevator 18, and cargo chamber 61 of the present embodiment correspond to a specific space, carriage 12 corresponds to a carriage, and delivery system 10 corresponds to a delivery system. In addition, control device 22 corresponds to a control device, CPU 23 corresponds to a processing control section, and storage section 24 corresponds to a storage section. In addition, schedule information 31 corresponds to schedule information, change information 32 corresponds to change information, operation information 33 corresponds to operation information, reference map 36 and floor maps **36*a* to 36*c* correspond to reference maps, and usage maps 38, 80, 83, 86, 88, 90, and 92 correspond to usage maps. In the present embodiment, an example of the control method according to the present disclosure is also clarified by describing an operation of delivery system 10**.

Control device 22 of the present embodiment described above performs processing of preparing new usage map 38 used by automatic movement device 40 by adding a change to reference map 36 of the specific space, based on schedule information 31 including change information 32 including the change region in which movable region 15 of automatic movement device 40 is changed in the specific space and the change time at which the region is changed, and operation information 33 including the operation time at which automatic movement device 40 starts operating. In control device 22, usage map 38 closer to the actual state can be prepared in advance by using schedule information 31 and considering a situation of the specific space. Therefore, in control device 22, the article can be more smoothly moved in accordance with a change in the situation of the specific space for moving the article. In addition, since control device 22 derives an optimum movement path of automatic movement device 40 by using usage map 38, it is possible to provide an efficient movement path in advance.

In addition, since control device 22 prepares usage map 38 by reflecting the change region included in schedule information on reference map 36, based on the change time included in schedule information 31, usage map 38 closer to the actual state can be prepared in accordance with the time at which the region is changed. In addition, since control device 22 transmits usage map 38 on which the change region is reflected to automatic movement device 40, based on the change time included in schedule information 31, automatic movement device 40 can use usage map 38 closer to the actual state in accordance with the change time of the specific space. Furthermore, since control device 22 prepares usage map 38 by reflecting the change region included in schedule information 31 on the reference map 38, based on the operation time included in schedule information 31, usage map 38 closer to the actual state can be prepared in accordance with the operation time of automatic movement device 40. Furthermore, since control device 22 transmits usage map 38 on which the change region is reflected to automatic movement device 40, based on the operation time included in schedule information 31, automatic movement device 40 can use usage map 38 closer to the actual state in accordance with the operation time of automatic movement device 40.

Furthermore, when the information on the object (obstacle) existing in the specific space is acquired from operated automatic movement device 40 or another operated automatic movement device 40, control device 22 prepares usage map 38 by adding a change in movable region 15 of automatic movement device 40 to reference map 36, based on the acquired information on the obstacle. In control device 22, usage map 38 can be prepared by using the actual information recognized by automatic movement device 40 itself or another device. Furthermore, since control device 22 adds a change in movable region 15 by giving priority to the information on the obstacle which is acquired from automatic movement device 40 of a host device or another automatic movement device 40, compared to the information included in schedule information 31, usage map 38 closer to the actual situation can be prepared. Since control device 22 performs processing of coupling the movement region moving relative to the specific space to reference map 36 and processing of separating the movement region from reference map 36, usage map 38 including a movable region or a non-movable region of automatic movement device 40 can be prepared by newly coupling or separating the movement region. In addition, since the region of delivery vehicle 60 for delivering the article and the region of work elevator 18 on which automatic movement device 40 rides are included as the movement region, control device 22 can couple and separate the region to be added to or separated from the movable range region of automatic movement device 40. In addition, since control device 22 performs processing of coupling the movement region to doorway region 37 set in reference map 36, the movement region can be coupled to a predetermined position, and the usage map to which the movement region is coupled can be smoothly prepared.

As a matter of course, the present disclosure is not limited to the above-described embodiment in any way, and thus, the present disclosure can be embodied in various aspects without departing from the technical scope according to the present disclosure.

For example, in the above-described embodiment, although control device 22 prepares new usage map 38, when the current time reaches the change time included in schedule information 31, and when the current time reaches the operation time included in schedule information 31, the configuration is not particularly limited to this, and control device 22 may prepare new usage map 38 when the current time reaches either the change time or the operation time. In addition, although control device 22 transmits usage map 38 to automatic movement device 40, when the current time reaches the change time included in schedule information 31 and when the current time reaches the operation time included in schedule information 31, the configuration is not particularly limited to this, and usage map 38 may be transmitted to automatic movement device 40 when the current time reaches either the change time or the operation time. Even in control device 22 configured in this way, usage map 38 closer to the actual state can be prepared and transmitted in advance, and the article can be more smoothly moved in accordance with a change in the situation of the specific space for moving the article.

In the above-described embodiment, although control device 22 prepares usage map 38 by using the information on the object (obstacle) existing in the specific space, the configuration is not particularly limited to this, and the processing may be omitted. In control device 22, usage map 38 closer to the actual state can be prepared in advance by simplifying the processing. In addition to automatic movement device 40, region detection device 29 (refer to FIG. 12) disposed inside the specific space may be used for detecting the obstacle.

Figure 14C:
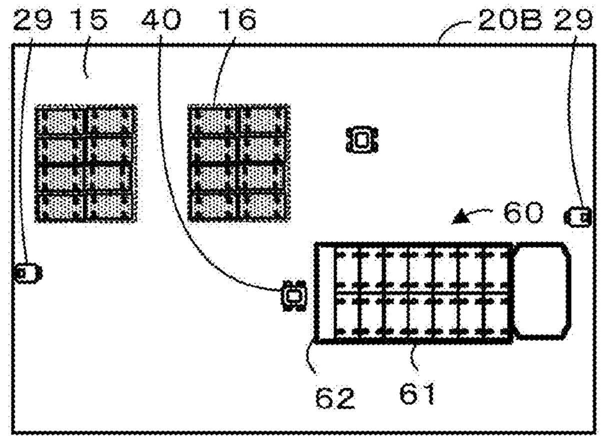
FIG. 14 is an explanatory view in a t state where tail gate 62 is closed.
Figure 14D:
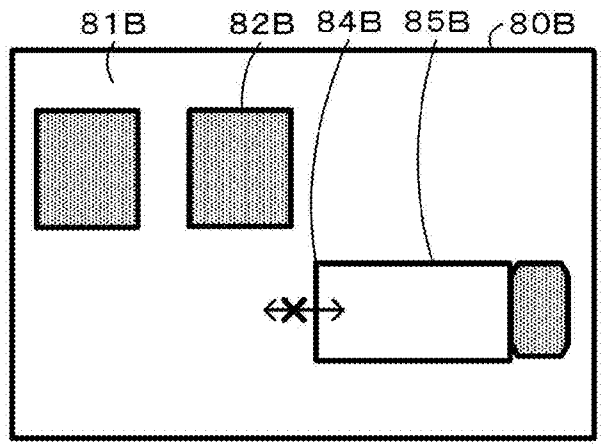

In the above-described embodiment, although a case where automatic movement device 40 can enter and exit through doorway 17 has been described, a case where automatic movement device 40 cannot move to delivery vehicle 60 through doorway 17 will be described. FIG. 14 is an explanatory view in a state where tail gate 62 is closed, FIG. 14A is an explanatory view of logistics center 20, FIG. 14B is an explanatory view of usage map 80 of logistics center 20, FIG. 14C is an explanatory view of logistics center 20B, and FIG. 14D is an explanatory view of usage map 80B of logistics center 20B. In this case, movement control section 41 of automatic movement device 40 causes detection sensor 47 to detect that doorway region 84 of movement region 85 is closed. Movement control section 41 transmits information indicating a non-movable state to logistics PC 21. When CPU 23 of control device 22 acquires a signal indicating that the doorway of movement region 85 is closed from automatic movement device 40, CPU 23 displays and outputs information indicating that tail gate 62 is closed. A worker who confirms the information advises delivery vehicle 60 to open tail gate 62. Control device 22 can cope with the situation where the movement device 40 can enter added movement region 85 by locally detecting automatic movement device 40. Control device 22 can also cope with the same situation in logistics center 20B.

In the above-described embodiment, although a case where delivery vehicle 60 is connected to predetermined doorway 17, control device 22 may cope with the situation as follows when delivery vehicle 60 is connected to doorway 17 in a deviated manner. Movement control section 41 of automatic movement device 40 can causes detection sensor 47 to detect that movement region 85 is connected in the deviated manner. In this case, movement control section 41 calculates a deviation amount of delivery vehicle 60 by using a detected value of detection sensor 47, and transmits the deviation amount to logistics PC 21. Control device 22 of logistics PC 21 uses the deviation amount, couples the deviation amount to reference map 36 in a state where the movement region is shifted, and prepares usage map 38. Control device 22 transmits newly prepared usage map 38 to automatic movement device 40, and performs processing of moving automatic movement device 40 by using new usage map 38. In control device 22, automatic movement device 40 can properly move even when delivery vehicle 60 deviates. The present disclosure is highly meaningful when applied to logistics center 20B (FIG. 12) having an open space in which delivery vehicle 60 is likely to deviate. Alternatively, when delivery vehicle 60 deviates from the floor map, control device 22 may cope with the situation by automatic movement device 40 performing processing of shifting a position of the host device.

In the above-described embodiment, although usage map 38 is prepared by adding the change between movable region 15 and non-movable region 16 inside the specific space when a change is added to reference map 36, the configuration is not particularly limited to this, and the processing may be omitted. Alternatively, in the above-described embodiment, although a case of performing the processing of coupling the movement region moving relative to the specific space to reference map 36 when the change is added to reference map 36 has been described, the configuration is not particularly limited to this, and the processing may be omitted. Usage map 38 may be prepared by either changing usage map 38 inside the specific space or coupling and separating usage map 38 inside the specific space.

In the above-described embodiment, although a case where automatic movement device 40 is the AMR has been described, the configuration is not particularly limited to this, and automatic movement device 40 may be an automatic guided vehicle (AGV) that moves on a predetermined traveling road. In automatic movement device 40, carriage 12 can also be automatically moved, and a workload of a worker can be further reduced. When automatic movement device 40 is the AGV, detection sensor 47 may have a simpler configuration, or may be omitted.

In the above-described embodiment, although the preparation of usage map 38 in logistics center 20 has been described, the configuration is not particularly limited to this, and the preparation of usage map 38 may be applied to shop 50. In addition, although control device 22 of logistics PC 21 prepares the usage map, the configuration is not particularly limited to this, and any one or more of control section 72 of management server 70, control section 52 of shop PC 51, movement control section 41 of automatic movement device 40 may prepare usage map 38. That is, as long as prepared usage map 38 can be directly or indirectly transmitted to automatic movement device 40, any device may have a function of the control device according to the present disclosure.

In the above-described embodiment, although automatic movement device 40 includes mecanum wheel 45 and is movable in an endless manner, the configuration is not particularly limited to this as long as automatic movement device 40 has a configuration capable of traveling. Automatic movement device 40 may have a normal wheel. In this case, automatic movement device 40 may include four wheels, three wheels, or may include two main wheels and one or more sub wheels.

In the above-described embodiments, although the present disclosure has been described as delivery system 10 or control device 22, the configuration is not particularly limited to this, and may be a control method used in a delivery system.

Here, the present disclosure may be configured as follows. For example, in the control device according to the present disclosure, the processing control section may prepare the usage map by reflecting the change region included in the schedule information on the reference map, based on the change time included in the schedule information. In the control device, the usage map closer to the actual state can be prepared in accordance with the time at which the region is changed. Here, for example, the "reflected on the reference map, based on the change time" may mean reflected on the reference map before a predetermined time in the change time (for example, 2 minutes before, 5 minutes before, or 10 minutes before), may mean reflected on the reference map at the change time, or may be reflected on the reference map after the current time reaches the change time. In addition, the control device according to the present disclosure may transmit the usage map on which the change region is reflected to the automatic movement device, based on the change time included in the schedule information. In the control device, the automatic movement device can use the usage map closer to the actual state in accordance with the change time in the specific space. For example, as in the above-described configuration, the "transmitting the usage map, based on the change time" may mean transmitting the usage map before a predetermined time in the change time, at the change time, or after the current time reaches the change time.

In the control device according to the present disclosure, the processing control section may prepare the usage map by reflecting the change region included in the schedule information on the reference map, based on the operation time included in the schedule information. In the control device, the usage map closer to the actual state can be prepared in accordance with the operation time of the automatic movement device. Here, for example, the "reflected on the reference map, based on the operation time" may mean reflected on the reference map before a predetermined time in the operation time (for example, 2 minutes before, 5 minutes before, or 10 minutes before), may mean reflected on the reference map at the operation time, or may mean reflected on the reference map after the current time reaches the operation time. In addition, the control device according to the present disclosure may transmit a usage map reflecting the change region to the automatic movement device based on an operation time included in the schedule information. In the control device, the automatic movement device can use the usage map closer to the actual state in accordance with the operation time of the automatic movement device. For example, as in the above-described configuration, the "transmitting the usage map, based on the operation time" may mean transmitting the usage map before a predetermined time in the operation time, at the operation time, or after the current time reaches the operation time.

In the control device according to the present disclosure, when the processing control section acquires the information on the object existing in the specific space from the operating automatic movement device or from another device excluding the operating automatic movement device, the processing control section may prepare the usage map by adding the change in the movable region of the automatic movement device to the reference map, based on the acquired information on the object. In the control device, the usage map can be prepared by using the actual information on the position and the size of the object recognized by the automatic movement device itself or another device. Here, examples of another device excluding the automatic movement device include another automatic movement device and a detection device disposed inside the specific space.

In the control device according to the present disclosure in an aspect of acquiring the information on the object existing in the specific space, the processing control section may add the change in the movable region of the automatic movement device to the reference map by giving priority to the information on the object existing in the specific space which is acquired from the operating automatic movement device or from another device excluding the operating automatic movement device, in comparison to the information included in the schedule information. In the control device, the usage map closer to the actual state can be prepared.

In the control device according to the present disclosure, when adding the change to the reference map, the processing control section may perform at least one of processing of coupling the movement region moving relative to the specific space to the reference map, and processing of separating the movement region from the reference map. In the control device, since the movement region is newly coupled or separated, the usage map including the movable region or the non-movable region of the automatic movement device can be prepared.

In the control device according to the present disclosure in an aspect in which the movement region is coupled or separated, the movement region may include at least one of the region of the delivery vehicle for delivering the article and the region of the work elevator on which the automatic movement device rides. In the control device, the control device can couple and separate the region to be added to or separated from the movable range region of the automatic movement device such as the delivery vehicle and the work elevator.

In the control device according to the present disclosure in an aspect in which the movement region is coupled or separated, the processing control section may perform processing of coupling the movement region to the doorway region set in the reference map. In the control device, since the movement region can be coupled to a predetermined position, the usage map to which the movement region is coupled can be smoothly prepared.

In the control device according to the present disclosure in an aspect in which the movement region is coupled or separated, the processing control section may output the information indicating that the doorway of the movement region is closed, when a signal indicating that the doorway of the movement region is closed is acquired from the automatic movement device. The control device can cope with a situation where the automatic movement device can enter added movement region. In this case, the processing control section may output a command to open the doorway to the device corresponding to the movement region.

According to the present disclosure, there is provided the delivery system for delivering the article, the delivery system including the management device including the control device according to any one of the above-described configurations, and the automatic movement device configured to automatically move the article inside the specific space, in which the automatic movement device acquires the usage map prepared by the control device from the control device, and uses the usage map for the movement of the article. Since the delivery system includes any one of the control devices described above, it is possible to obtain an advantageous effect corresponding to the adopted aspect.

According to the present disclosure, there is provided the control method used in the delivery system having the automatic movement device that automatically moves the article inside the specific space and delivering the article, the control method including a step of performing processing of preparing the usage map used by the automatic movement device by adding a change to the reference map of the specific space, based on the schedule information including at least one of the change information including the change region in which the movable region of the automatic movement device is changed in the specific space and the change time at which the region is changed, and the operation information including the operation time at which the automatic movement device starts operating.

In the control method, as in the above-described control device, the usage map closer to the actual state can be prepared in advance by using the schedule information and considering the situation of the specific space. Therefore, the control device can more smoothly move the article in accordance with a change in the situation of the specific space for moving the article. In the control method, various aspects of the above-described control device may be adopted, or steps for realizing each function of the above-described control device may be added.

INDUSTRIAL APPLICABILITY

The carriage aligning device, the automatic movement device, the delivery system, and the control method according to the present disclosure can be used in a technical field of a commodity logistics system for delivering commodities.

REFERENCE SIGNS LIST

10 Delivery system, 11 Network, 12 Carriage, 13 Loading section, 14 Caster, 15 Movable region, 16 Non-movable region, 17 Doorway, 18 Work elevator, 20 Logistics center, 21 Logistics PC, 22 Control Device, 23 CPU, 24 Storage section, 28 Communication section, 29 Region detection device, 30 Delivery management information, 31 Schedule information, 32 Change information, 33 Operation information, 35 Obstacle information, 36 Reference map, 36*a* to 36*c* Floor map, 37 Doorway region, 38 Usage map, 40 Automatic movement device, 41 Movement control section, 42 Storage section, 43 Vehicle body part, 44 Lift portion, 45 Mecanum wheel, 46 Movement driving section, 47 Detection sensor, 48 Communication section, 50 Shop, 51 Shop PC, 52 Control section, 54 Storage section, 58 Communication section, 59 Display shelf, 60 Delivery vehicle, 61 Cargo chamber, 62 Tail gate, 63 Tail lift, 70 Management server, 72 Control section, 74 Storage section, 78 Communication section, 80, 83, 86, 88, 90, 92 Usage map, 81 Movable region, 82 Non-movable region, 84, 89 Doorway region, 85, 87 Movement region, 91 Obstruction region.

The invention claimed is:

1. A control device used in a delivery system having an automatic movement device that automatically moves an article inside a specific space and delivers the article, the control device comprising:

a storage section configured to store schedule information including at least one of change information including a change region indicating a portion of a reference map in which a movable region of the automatic movement device is changed in the specific space and a change time indicating a time at which the movable region is changed, and operation information including an operation start time at which the automatic movement device starts operating; and a processing control section configured to perform processing of preparing a usage map representing a navigation map used by the automatic movement device by reflecting the change region on the reference map of the specific space, based on the change time included in the schedule information, wherein the usage map constrains movement of the automatic movement device by defining movable and non-movable regions used by the automatic movement device to generate a movement path when the automatic movement device operates.

2. The control device according to claim 1, wherein the processing control section prepares the usage map by reflecting the change region included in the schedule information on the reference map, based on the change time included in the schedule information.

3. The control device according to claim 1, wherein the processing control section prepares the usage map by reflecting the change region included in the schedule information on the reference map, based on the operation start time included in the schedule information.

4. The control device according to claim 1, wherein when the processing control section acquires information on an object existing in the specific space from the operating automatic movement device or from another device excluding the operating automatic movement device, the processing control section prepares the usage map by adding the change in the movable region of the automatic movement device to the reference map, based on the acquired information on the object.

5. The control device according to claim 4, wherein the processing control section adds the change in the movable region of the automatic movement device to the reference map by giving priority to the information on the object existing in the specific space which is acquired from the operating automatic movement device or from another device excluding the operating automatic movement device, in comparison to information included in the schedule information.

6. The control device according to claim 1, wherein when adding the change to the reference map, the processing control section performs at least one of processing of coupling a movement region corresponding to a movable region external to the specific space to the reference map, and processing of separating the movement region from the reference map.

7. The control device according to claim 6, wherein the movement region includes at least one of a region of a delivery vehicle for delivering the article and a region of a work elevator on which the automatic movement device rides.

8. The control device according to claim 6, wherein the processing control section performs processing of coupling the movement region to a doorway region set in the reference map.

9. The control device according to claim 6, wherein the processing control section outputs information indicating that a doorway of the movement region is closed, when a signal indicating that the doorway of the movement region is closed is acquired from the automatic movement device.

10. A delivery system for delivering an article, comprising:

a management device including the control device according to claim 1; and an automatic movement device configured to automatically move an article inside a specific space, wherein the automatic movement device acquires the usage map prepared by the control device from the control device, and uses the usage map for a movement of the article.

11. A control method used in a delivery system having an automatic movement device that automatically moves an article inside a specific space and delivers the article, the control method comprising:

performing processing of preparing a usage map representing a navigation map used by the automatic movement device by reflecting, on a reference map of the specific space, a change region indicating a portion of the reference map in which a movable region of the automatic movement device is changed, based on schedule information including at least one of change information including the change region and a change time indicating a time at which the movable region is changed, and operation information including an operation start time at which the automatic movement device starts operating, wherein the usage map constrains movement of the automatic movement device by defining movable and non-movable regions used by the automatic movement device to generate a movement path when the automatic movement device operates.

* * * * *